US008979525B2

(12) United States Patent
Staffler et al.

(10) Patent No.: US 8,979,525 B2
(45) Date of Patent: Mar. 17, 2015

(54) STREAMLINED BODY AND COMBUSTION APPARATUS

(75) Inventors: Franz Josef Staffler, Bozen (IT); Vincenzo Branzi, Terzolas (IT)

(73) Assignee: Brambel Trading Internacional LDS, Madeira (PT)

( * ) Notice: Subject to any disclaimer, the term of this patent is extended or adjusted under 35 U.S.C. 154(b) by 351 days.

(21) Appl. No.: 10/303,187

(22) Filed: Nov. 25, 2002

(65) Prior Publication Data

US 2003/0152878 A1 Aug. 14, 2003

Related U.S. Application Data

(63) Continuation-in-part of application No. 09/554,172, filed as application No. PCT/EP98/07175 on Nov. 10, 1998, now Pat. No. 6,575,733.

(30) Foreign Application Priority Data

Nov. 10, 1997 (DE) .................................. 197 49 688
Nov. 23, 2001 (DE) .................................. 101 58 295

(51) Int. Cl.
*F23R 3/00* (2006.01)
*F23C 99/00* (2006.01)
*F02K 9/62* (2006.01)
*F23D 14/62* (2006.01)
*F23G 7/05* (2006.01)
(Continued)

(52) U.S. Cl.
CPC . *F23C 99/00* (2013.01); *F02K 9/62* (2013.01); *F23D 14/62* (2013.01); *F23G 7/05* (2013.01); *F23L 7/005* (2013.01); *F23M 9/06* (2013.01); *F23C 2900/03005* (2013.01)

USPC ............... 431/4; 431/354; 431/207; 431/353; 60/749

(58) Field of Classification Search
USPC ............ 431/4, 158, 116, 350, 353, 354, 161, 431/207; 60/736, 737, 749
See application file for complete search history.

(56) References Cited

U.S. PATENT DOCUMENTS 1,980,266 A * 11/1934 Goddard ......................... 60/247
2,539,165 A 1/1951 Saha
2,583,570 A * 1/1952 Hickman ........................ 60/771
(Continued)

FOREIGN PATENT DOCUMENTS

CH 687 832 A5 2/1997
DE 655 849 1/1938
(Continued)

OTHER PUBLICATIONS

Aircraft Design: Synthesis and Analysis Textbook, Desktop Aeronautics, Inc., (1997), 2pgs.
(Continued)

*Primary Examiner* — Gregory Huson
*Assistant Examiner* — Nikhil Mashruwala
(74) *Attorney, Agent, or Firm* — Lathrop & Gage LLP

(57) ABSTRACT

The invention relates to a streamlined body for influencing the flow dynamics of a fluid, wherein the streamlined body at least partly corresponds to a rotationally symmetrical airfoil. A streamlined body of this kind can be used in a number of ways, for example as an impact member, as a flow regulator or as a heat exchanger. It also evens out and accelerates flows. It is used to particular advantage in a mixing and reaction chamber for burning fuels.

28 Claims, 10 Drawing Sheets

(51) Int. Cl.
  *F23L 7/00*      (2006.01)
  *F23M 9/06*      (2006.01)

(56) References Cited

U.S. PATENT DOCUMENTS

| | | | |
|---|---|---|---|
| 2,714,847 A * | 8/1955 | Svebel | 454/42 |
| 2,823,519 A | 2/1958 | Spalding | |
| 2,901,032 A * | 8/1959 | Brola | 431/354 |
| 2,920,445 A * | 1/1960 | Bailey | 60/262 |
| 3,320,744 A | 5/1967 | Blakely et al. | |
| 3,337,121 A | 8/1967 | Coanda | |
| 3,544,254 A | 12/1970 | Battigelli | |
| 3,565,562 A | 2/1971 | Drivet | |
| 3,589,383 A * | 6/1971 | Garnier | 137/806 |
| 3,605,407 A * | 9/1971 | Bryce | 60/749 |
| 3,804,579 A | 4/1974 | Wilhelm | |
| 3,817,690 A | 6/1974 | Bryce et al. | |
| 3,921,391 A | 11/1975 | Hall et al. | |
| 4,069,005 A | 1/1978 | Palani | |
| 4,077,337 A | 3/1978 | Demoiseau | |
| 4,115,862 A | 9/1978 | Stewart | |
| 4,203,717 A | 5/1980 | Facco et al. | |
| 4,432,516 A * | 2/1984 | Muscatell | 244/219 |
| 4,443,180 A * | 4/1984 | LeFrois | 431/4 |
| 4,683,541 A * | 7/1987 | David | 431/173 |
| 4,726,759 A | 2/1988 | Wegener | |
| 4,925,387 A | 5/1990 | Locanetto et al. | |
| 4,972,823 A | 11/1990 | Stadin | |
| 5,055,030 A | 10/1991 | Schirmer | |
| 5,095,696 A | 3/1992 | Gulati et al. | |
| 5,236,327 A | 8/1993 | Flanagan et al. | |
| 5,328,355 A | 7/1994 | Kobayashi et al. | |
| 5,394,690 A * | 3/1995 | Arszman et al. | 60/770 |
| 5,456,216 A | 10/1995 | Kaji et al. | |
| 5,630,320 A | 5/1997 | Matsuda et al. | |

FOREIGN PATENT DOCUMENTS

| | | |
|---|---|---|
| DE | 765 197 | 1/1957 |
| DE | 1 917 666 | 10/1970 |
| DE | 2 118 073 | 11/1971 |
| DE | 2 153 817 | 5/1973 |
| DE | 1 401 370 | 7/1975 |
| DE | 27 22 431 | 3/1978 |
| DE | 1 507 321 | 4/1978 |
| DE | G 84 10 281.0 | 8/1984 |
| DE | 39 29 759 C2 | 3/1993 |
| DE | 42 18 024 C2 | 12/1996 |
| DE | 198 06 315 A1 * | 8/1999 |
| DE | 198 60 237 C1 * | 7/2000 |
| FR | 2 349 368 | 11/1977 |
| RU | 2009702 C1 | 3/1994 |
| RU | 2067726 C1 | 10/1996 |
| RU | 2091668 C1 | 9/1997 |
| RU | 2162536 C2 | 1/2001 |
| WO | WO 93/04916 | 3/1993 |
| WO | WO 95/23942 | 9/1995 |
| WO | WO 00/37806 | 6/2000 |

OTHER PUBLICATIONS

Beitz, Wolfgang, "Taschenbuch fur den Maschinenbau" (1929).

* cited by examiner

STREAMLINED BODY AND COMBUSTION APPARATUS

CROSS-REFERENCE TO RELATED APPLICATION(S)

This application is a continuation-in-part of U.S. patent application Ser. No. 09/554,172, filed on May 10, 2000, now U.S. Pat. No. 6,575,733, which claims priority from PCT/EP98/07175, filed on Nov. 10, 1998, which is based on German patent application DE 19749688.1, filed on Nov. 10, 1997, all of which are herein incorporated by reference. This continuation-in-part application also claims priority to German patent application DE10158295, filed on Nov. 23, 2001, which is also incorporated by reference.

The present invention is related to a method for the combustion of fuels, in which the fuels are burnt together with air, possibly with the addition of water and/or an oxidizing agent, and a reactor for such a combustion method with a reaction chamber having supply openings for the fuel, the air, possibly the water and/or an oxidizing agent and an outlet opening for the combustion products.

The invention also relates to a streamlined body for influencing the dynamics of a flow as well as methods for using the streamlined body. The invention further relates to an apparatus for burning a fuel mixture having the streamlined body as well as methods for using the apparatus.

BACKGROUND OF THE INVENTION

An apparatus and a method for combustion of oil with the addition of water are known of WO95/23942, in which oil is introduced into a combustion chamber until an oil bath has formed, which is then preheated to a temperature between 250° C. and 350° C. Then water is sprayed onto the surface of the hot oil bath, which results in a flame eruption with the simultaneous supply of air into the combustion chamber. The level of the oil bath should not remain under a height of 3 to 4 mm during combustion in order to prevent an interruption of the combustion. The apparatus used to this purpose includes in general a combustion chamber in the form of a frustrum of a pyramid or a cone with lateral supply openings for oil and water from corresponding reservoirs. The oil bath is electrically heated. Air enters along with the water into the interior of the combustion chamber. The flame with a temperature of 1200° C. to 2000° C. is introduced into an oven via a cylindrical tube for heating purposes.

In this known method of combustion especially of waste oils the temperature gradient appearing in the oil bath in the direction to the bottom has proved to be disadvantageous, because the bottom temperature can be lower than the evaporation temperatures of heavy fractions in the waste oil the result of which is that the latter form a not completely burnable oil mass at the bottom of the combustion chamber. Injecting the oil via a nozzle is not practical, because residues and highly viscous components in the waste oil will lead to a clogging of the nozzles. Moreover the entire apparatus with its feeding and preheating means gets constructively complex. Because of the remaining residues the process control is hard to perform, especially when shutting down. Therefore the facility is not suited for a continuous operation.

From GB 765 197 an apparatus for the combustion of liquid and liquefiable fuels is known, which consists of a cylindrical combustion chamber with an adjacent fire space, which is open to the top. The liquid fuel is radially or tangentially introduced into the interior of the combustion chamber, and air is separately introduced tangentially, which the fuel is contacting the inner surface of the combustion chamber and is evaporated and burnt there. Temperatures appearing in the fire space are between 1500° C. and 1800° C. With incomplete combustion by reduced air supply the fuel is cracked with the aid of supplied vapour, whereby heavy oils are decomposed into lower hydrocarbons, hydrogen and carbon monoxide.

Also in this known combustion method the way of supply is technically demanding, and moreover the danger exists that in certain wall regions the temperature is not sufficient for evaporation of heavier waste oil fractions, which then gather at the bottom of the combustion chamber and form a non-burnable residue there. Water vapour is here not provided for the actual combustion but only for cracking of heavy oils.

In U.S. Pat. No. 4,069,005 the combustion of a water/fuel/air mixture in the presence of a metal catalyst (nickel) is proposed, wherein in the interior of the burner several stacked plates, which may also consist of the metal catalyst, can be disposed, to increase the efficiency of the resulting cracking. In the apparatus serving this purpose liquid fuels and water are respectively dropped upon the catalyst from above, the plates having been heated to a temperature above 800° C. in a preheating phase. The rising vapours are led along the metal catalysts, whereby easily burnable, gaseous hydrocarbons are generated by cracking, which burn in the further process, whereby combustion gases of 800° C. to 1000° C. are generated.

For the generation of a long flame for heating an industrial boiler in U.S. Pat. No. 3,804,579 oil and air are burnt together with water vapour, which is generated in a heat exchange coil by the flame. Here the extended flame burns at about 730° C.

Finally from DE 39 29 759 C2 a facility for burning waste oil products is known, in which the waste oils are mixed with a usual heating oil with a known smaller viscosity, such that an average product with constant viscosity is formed, which is then preheated and injected into a tank. On the opposite side of the tank input devices for air, water and common neutralizing agents are provided. For injecting the oil mixture air or water vapour is used. The control facility for the mixing ratio of the oils and the injection apparatus for the oil mixture with additional supply leads for air and neutralizing agents lead to a constructively complex facility, which is hard to control, and which cannot work efficiently, because apart from the actual combustion product of waste oil considerable amounts of normal heating oil have to be burned additionally, which largely limits the disposal capacity. The simple combustion tank cannot support the combustion process.

Flow bodies or baffle members are used in various technical fields for deflecting flows or influencing their dynamics. In combustion technology, for example, it is known to improve the distribution of a fuel mixture which is to be burned inside a reaction chamber by placing a deflector surface in the direction of flow of the mixture. A deflector surface of this kind is used herein as well as in WO99/24756 to deflect the mixture which is to be burned out of its original direction of influx and distribute it as symmetrically as possible inside the reaction chamber. This promotes mixing of the individual components of the fuel mixture and thus achieves fast and total combustion. In these embodiments the deflector surface has conical or pyramidal surfaces with an apex that points in the direction of the inflowing mixture.

One disadvantage of a deflector surface of this kind is that because of the deceleration of the components of the fuel mixture associated with the deflection and because of the partial reflection of these components back in the direction of the inflow openings, it is not possible to achieve the desired homogenous flow of the combustible mixture accelerating in the direction of the outlet opening of the reaction chamber.

Moreover, DE2153817OS discloses a burner for burning waste materials wherein the waste materials together with air supplied step by step enter a combustion chamber in which there is a so-called hot bulb. This hot bulb is conical in shape and is arranged with its tip pointing in the direction of the inflowing mixture which is to be burned and coaxially with the axis of the combustion chamber. This hot bulb is at a temperature of 1200 to 1400° C. and causes combustion of unburnt components of the waste material such as, for example, solid particles which are difficult to burn. This hot bulb may also be in the form of a ring.

A hot bulb of this kind according to DE2153817OS has a negative effect on the flow dynamics in the combustion chamber for the reasons mentioned above.

BRIEF SUMMARY OF THE INVENTION

The present invention provides a method for the environmentally friendly combustion of fuels of an arbitrary state of aggregation, possibly with the addition of water and/or an oxidizing agent, in which the fuel is burnt without residues with a high energy efficiency. The reactor suitable for this is intended to optimize the combustion process in continuous operation with a low constructive effort, and it should be as maintenance-free as possible, and it should be self-cleaning.

According to the invention the solid and/or liquid and/or gaseous fuel, possibly the water and/or an oxidizing agent are introduced into a reaction chamber under high pressure in axial direction by pressurized air, the amount of injected pressurized air corresponding to the amount of air, which is necessary for the complete combustion, the introduced mixture is led to a deflection surface in the interior of the reaction chamber, whereby it is further atomized, liquid components evaporate, solid one sublimate and the mixture burns explosively, before it can reach the wall of the bottom of the reaction chamber. The explosive combustion process can be explained by the high degree of the surface increase of the mixture introduced into the reaction chamber:

(a) the fuel supplied by pressurized air is disintegrated and atomized, when it is injected into the reaction chamber;

(b) the existing pressure is still sufficient to lead the fuel with high velocity to a deflection surface in the interior of the reaction chamber, where an impingement and a reflection with a further distribution and atomization are caused.

Additional water injected with pressurized air is atomized into droplets, when entering the reaction chamber, the droplets changing into water vapour and being distributed into all directions in the interior space of the reaction chamber by the deflection surface. The expansion caused by the sudden evaporation supports a mixing of the fuels with the present pressurized air and the water vapour, which leads to an efficient combustion, especially of hardly burnable fuel components. This way a precipitation of fuel at the inner wall and a concentration of residues at the bottom can be more efficiently avoided, so that the reactor cleans itself.

The pressurized air flow can be injected at 2 to 10 bar, preferably at 3 to 5 bar into the reaction chamber. At these pressures the combination of the atomization at the exit from the supply lead with the one caused by the impact onto the deflection surface in the interior space of the reaction chamber is especially efficient.

The fuels, the water and/or the oxidizing agent are respectively introduced separately or as a mixture via one or several Venturi tubes into the pressurized air flow. Gaseous fuel can thereby be individually introduced into the reaction chamber. This way of supply allows for a good dosibility with a low constructive effort and simultaneously enhances the atomizing effect at the entrance into the reaction chamber. The injection into the reaction chamber is accomplished by a normal tube of a small diameter without a nozzle top, whereby a clogging of the nozzle at the time of combustion of waste oils by non-burnable residues or highly viscous components is prevented. The constructive effort is lowered furthermore by the use of uniform Venturi tubes for the supply of the fuels and the water.

It is favorable to keep the temperature inside the reaction chamber homogeneous to the axis of the reaction chamber by heat conducting reactor walls. When by the deflection surface a symmetric distribution of the mixture inside the reaction chamber is caused, a more uniform combustion can be achieved at a symmetric temperature distribution.

At a predetermined geometry of the reaction chamber the inflow velocities into the reaction chamber of the mixture to be burnt can be adjusted, so that the resulting combustion flame leaves the reaction chamber at least with the velocity of sound and the resulting heat energy is transported to the outside for further use. This can be further improved by suitable reactor geometries as described below.

The ignition of the mixture in the reaction chamber is preferably performed by a starter flame or by a generated spark. It can be advantageous to preheat the fuels, the water or the air by the waste heat generated in the combustion, before they are introduced into the reaction chamber. Especially heavy oil becomes easier transportable by the decrease in velocity achieved hereby. The fluid dynamics of the combustion process can be influenced by inserts, that can be introduced into the inner space of the reaction chamber.

It is advantageous to additionally crack the fuel at the time of combustion, wherein as catalyst e.g. a nickel containing material can be used.

The reactor according to the invention has a hyperboloid-like-like reactor head which is adjacent to the outlet opening of the reaction chamber and the cross section of which increases from there. The combustion flame burns at this reactor head. The nozzle like geometry of the reactor thereby causes an acceleration of the combustion gases with the formation of a corresponding vacuum in the outlet region of the reaction chamber, which leads to a further acceleration of the substances to be burnt in the interior of the reaction chamber in the direction of the outlet opening, which positively influences the combustion and the self-cleaning of the reactor.

The nozzle effect can be improved by a tapering of the reaction chamber at least in its upper part in the direction of the outlet opening, whereby the tapering part can be provided specially as a frustrum of a pyramid or a cone. On the other hand the entire reaction chamber can have a hyperboloid-like-like shape, so that it tapers in the direction of the outlet opening.

With the nozzle-shaped reactor geometry it is favorable to embed the supply openings for the fuels (and the water) into the bottom of the reaction chamber, so that these are directed parallel to the axis of the reaction chamber. Hereby the axis of the reaction chamber is determined as the preferred flow direction, in which for the better distribution of the mixture to be burnt, a deflection surface can be disposed, by which the mixture is first deflected from the axis of the reaction chamber and is subsequently directed again to this axis by the mentioned nozzle effect. Moreover, the effusion from the supply openings is favored by the pressure conditions.

A cone, the tip of which is directed against the flow direction of the fuel or a pyramid of a fire resistant material, which is directed in the same way, being disposed in the interior of the reaction chamber along its axis, can be used as deflection surface for achieving a homogeneous distribution. The combustion process can thereby be optimized by symmetric distribution in the cross-section of the reaction chamber of physical quantities such as pressure, flow velocity, turbulence and temperature.

If the fuel is intended to be additionally cracked, it is advantageous to provide a metal catalyst, especially a nickel-containing one, e.g. in the interior walls of the reaction chamber in fire-resistant inserts in the interior of the reaction chamber or even in the deflection surface. A high efficiency of the catalytic cracking can be achieved by a scaled or porous metal catalyst with a large surface.

The reactor can uniformly be fabricated of a material like stainless steel, but it can also, at least partially, be fabricated of a specially heat-resistant and mechanically robust alloy like a Ni—Mo—Cr—Co alloy ("Nimonic"). Moreover, the reactor can be surrounded by an outer insulation of ceramics fibres or fiberglass to reduce the amount of radiated heat and to maintain the temperature in the reaction chamber above 1000° C.

In alternative embodiments, the present invention sets out to provide a streamlined body which generally has a positive influence on the dynamics of a flow for various applications and in particular makes it possible to even out the flow and control the flow velocity. The streamlined body is particularly intended for use in the combustion of a fuel mixture.

According to various embodiments of the invention, the outer surface of the streamlined body at least partially corresponds to a symmetrically rotated airfoil. For the purposes of the present description, the term airfoil means a profile which substantially corresponds to the top surface of the cross-section of an airplane wing. A symmetrically rotated airfoil can thus be produced by rotating an airplane wing profile about its chord. The streamlined body according to the invention may then correspond wholly or at least partially to a symmetrically rotated airfoil of this kind. It may be advantageous to make the streamlined body variable in its geometry. For this purpose the streamlined body may be made up of several parts which are exchangeable in order to adapt geometric parameters such as diameter or length to changing situations. It is also possible to construct a flow body which is dynamically variable in its geometry.

In a totally rotationally symmetrical streamlined body according to the invention, with a fluid flowing in parallel to the rotation axis, the flow times along the surface of the streamlined body are equal. In an airfoil there are two stagnation points, the front stagnation point being at the blunt end and the rear stagnation point being at the pointed rear end of the profile. It is advantageous to arrange the streamlined body in the flow in such a way that the rear stagnation point is in the downstream position.

In an arrangement of this kind the flow velocity increases during flow from the front to the rear stagnation point compared with the flow velocity without a streamlined body. Any lift forces occurring, as are known with airfoil profiles, cancel each other out thanks to the symmetry of the arrangement.

Moreover, the above-mentioned rotationally symmetrical streamlined body according to the invention may be used to produce laminar flow. Because of the rotational symmetry the fluid particles proceeding from the front stagnation point reach the rear stagnation point at the pointed rear edge of the profile at the same time, so that laminar flow is obtained. At the same time the flow velocity is increased over that which is obtained without a streamlined body as there is a decrease in pressure on the top (suction side) of an airfoil.

The increase in flow velocity achieved by the introduction of the streamlined body according to the invention can be used to generate a suction effect in order to accelerate a fluid and/or particles carried by a fluid in the direction of flow and/or to entrain the fluid and/or particles into the flow (by sucking them in). For example, feed openings for solid particles which are automatically sucked into the flow by the suction effect mentioned above may be provided upstream.

Another use of a rotationally symmetrical streamlined body according to the invention is its use as an impact surface, particularly in a flowing fluid carrying solid and/or liquid particles.

The term fluid denotes a gaseous or liquid medium or a mixture of a gaseous and liquid medium. Fluids of this kind may carry with them particles in the state of a solid or liquid aggregate. Fuel mixtures, for example, frequently consist of a combustible fluid which contains highly viscous (liquid) or solid constituents which are difficult to burn. Combustible gases which carry atomised liquid and/or solid particles are also used as a fuel mixture.

When a fluid carrying solid and/or liquid particles meets a rotationally symmetrical streamlined body according to the invention, the particles are deflected depending on the speed of flow and impact. This can be used to atomise and break up droplets of liquid or highly viscous particles carried in the fluid or to break up solid particles. However, it is also possible to use this effect for separation. For example, particles deflected in the radial direction may adhere to a wall (or the like) and thus be separated from the rest of the fluid current.

The streamlined body according to the invention may also be used as a heat exchanger. If there is a temperature gradient in a flow, the introduction of a streamlined body according to the invention made of a material that conducts heat into this streamlined body (or on its surface) will start a flow of heat, the heat flowing from the warmer part of the streamlined body to the colder part.

If, for example, in a combustion process, a flame is produced in a section behind the rear stagnation point of the streamlined body, the streamlined body heats up during the combustion process from the rear stagnation point towards the front stagnation point. As a result, the fuel mixture hitting the front stagnation point is preheated. Further advantages are obtained by using a streamlined body according to the invention in a combustion process as described hereinafter.

Another use of the streamlined body is as a flow regulator. Flow regulators regulate the quantity of flow and the speed of flow of a fluid by constricting the area of flow of the fluid. In conventional valves this is done by means of a valve body incorporated in the flow area. However, the constriction frequently results in swirls at the valve body so that it is difficult to measure and control the quantity or speed of flow precisely. Moreover, in numerous applications, a laminar flow after the valve is desirable.

A rotationally symmetrical streamlined body according to the invention can now be used like a valve body in a flow regulator, being arranged with its rotation axis parallel to the direction of flow and with its sharp rear edge downstream in front of a valve outlet line of reduced cross-section. The diameter of the streamlined body is selected so as to suit the diameters of the lines. By moving the streamlined body according to the invention in the direction of flow the cross-section of the valve outlet line can be covered in a variable manner thereby controlling the quantity and velocity of fluid flowing into the outlet line. To close off the line the streamlined body is pushed along until it makes contact with the valve outlet line. The flow going past the streamlined body according to the invention is laminar and allows satisfactory measurement of the flow quantity and optimum adjustment of the flow velocity.

One application in which the above qualities of the streamlined body according to the invention can be used to their full extent is its use in a combustion process in which a fuel mixture flowing through a mixing and reaction chamber is combusted, the streamlined body according to the invention being arranged with its main axis inside the chamber in the direction of flow.

For optimum function, the blunt section is used as the front stagnation point and the sharp rear edge of the profile is used as the rear stagnation point of the streamlined body. On the one hand it is possible to use a rotationally symmetrical flow body the rotation axis of which runs parallel to the main axis of the mixing and reaction chamber or is located thereon. However, it is also possible to use two or more halves or pieces of such a streamlined body (with the separation surface or edge roughly running along the rotation axis) and to mount the halves of the streamlined body on the wall of the chamber, distributed around its circumference.

When the streamlined body is used in this way the following favorable effects are achieved. The fuel mixture, which may contain liquid, gaseous and solid constituents, is deflected as it strikes the streamlined body, thereby promoting the mixing of the individual components which are to be burned. Liquid constituents atomise on impact while solid ones are broken up. This initially produces turbulence in the front part of the streamlined body. Overall, this can increase the residence time of the fuel components and promote their mixing in the chamber.

At the same time the flow is evened out downstream along the streamlined body. The mixture is accelerated in the region of the streamlined body, the velocity vectors in the vicinity of the streamlined body extending parallel thereto, and their magnitude increasing initially as the radial spacing increases, in order to decrease again towards the outer boundaries (e.g. the wall of the chamber). Overall, after flowing round the streamlined body, a laminar flow is obtained. At an outlet opening of the mixing and reaction chamber the fuel mixture is ignited and a flame appears close to the outlet opening. It is advantageous not to produce any reflux of the fuel mixture or combustion products counter to the direction of the outlet opening, in order to prevent blowback of the flame. The present streamlined body accelerates the flow of the fuel mixture towards the outlet opening so that the combustion products leave the chamber through the outlet opening at a high velocity (approaching or above the speed of sound), resulting in a suction effect which assists the feeding of the components of the fuel mixture into the chamber.

When used in this way, the streamlined body according to the invention acts as a heat exchanger as the streamlined body heats up towards the front stagnation point starting from the rear stagnation point which is closest to the combustion flame. In permanent operation, the streamlined body can consequently be used as a heat exchanger which preheats the incoming components of the fuel mixture. This assists the atomising and evaporation of liquid components, the breakup and sublimation of solid components and, overall, the preheating of the fuel mixture, thereby particularly reducing the viscosity of highly viscous components which are difficult to burn. As a result of this effect the speed of combustion is increased and complete combustion of even those components which do not burn easily in the mixture is assisted. This significantly increases the performance of the burner (heat output) so that more fuel can be burnt in the same period of time.

In some embodiments, a rotationally symmetrical streamlined body is arranged with its rotation axis along the axis of the reaction chamber, the rear stagnation point (sharp rear edge of the profile) being directed towards the outlet opening of the chamber. It is advantageous to arrange it close to the outlet opening, while the constriction produced in the region of the outlet opening can be adjusted by altering the position of the streamlined body so that the latter additionally acts as a flow regulator.

The streamlined body may, for example, be held by the (cylindrical) wall of the chamber by means of thin retaining strips. A sectional construction is also advantageous so that individual components of the streamlined body can be exchanged in order to optimise the combustion process. For example, the streamlined body may be subdivided into a front, middle and back section, while the geometric parameters can be varied by exchanging these sections. In order to measure the parameters of the combustion process and the properties of the streamlined body itself, sensors and measuring lines can be introduced onto or into the streamlined body from outside by means of the above mentioned retaining strips. This gives easy access to the interior of the mixing and reaction chamber.

The advantages described above can be achieved with an apparatus according to the invention for burning a fuel mixture, which comprises a mixing and reaction chamber, and a streamlined body arranged with its main axis within the chamber in the direction of flow. Basically, the shape of the mixing and reaction chamber can be freely selected, e.g. it may be of a simple cylindrical shape.

It is advantageous if the above mentioned combustion apparatus comprises a mixing and reaction chamber which tapers downstream to widen out again in cross section subsequently so that a neck constitutes the point with the smallest cross section. The streamlined body is conveniently arranged in front of the neck in the direction of flow in a geometric configuration of this kind. It has proved particularly advantageous to have a geometric shape in which the mixing and reaction chamber has a cylindrical lower section, adjacent to which is a conically tapering section, while adjoining the neck thus formed is a head of hyperboloid-like shape with a widening cross section which itself ends in an outlet opening. Together with the streamlined body arranged in the mixing or reaction chamber, an apparatus of this kind can be used to achieve optimum regulation of all the combustion parameters as required in particular for burning fuels of different compositions, particularly with highly viscous components.

The apparatus described are suitable for use as burners, i.e. for heating a volume provided downstream thereof, or for use as a propulsive unit, i.e. for producing thrust.

This invention will subsequently be discussed in greater details in an embodiment referring to the figures.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION

Figure 1:
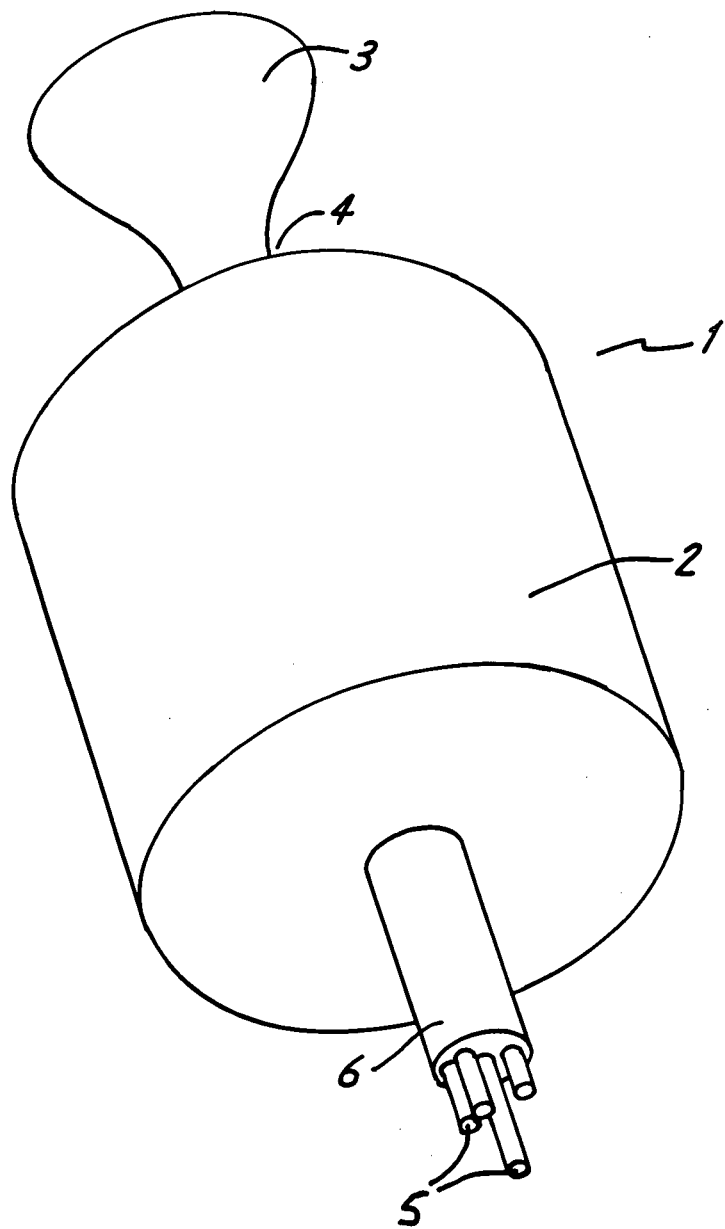
FIG. 1 is a side view from below of a reactor according to the invention.
Figure 2:
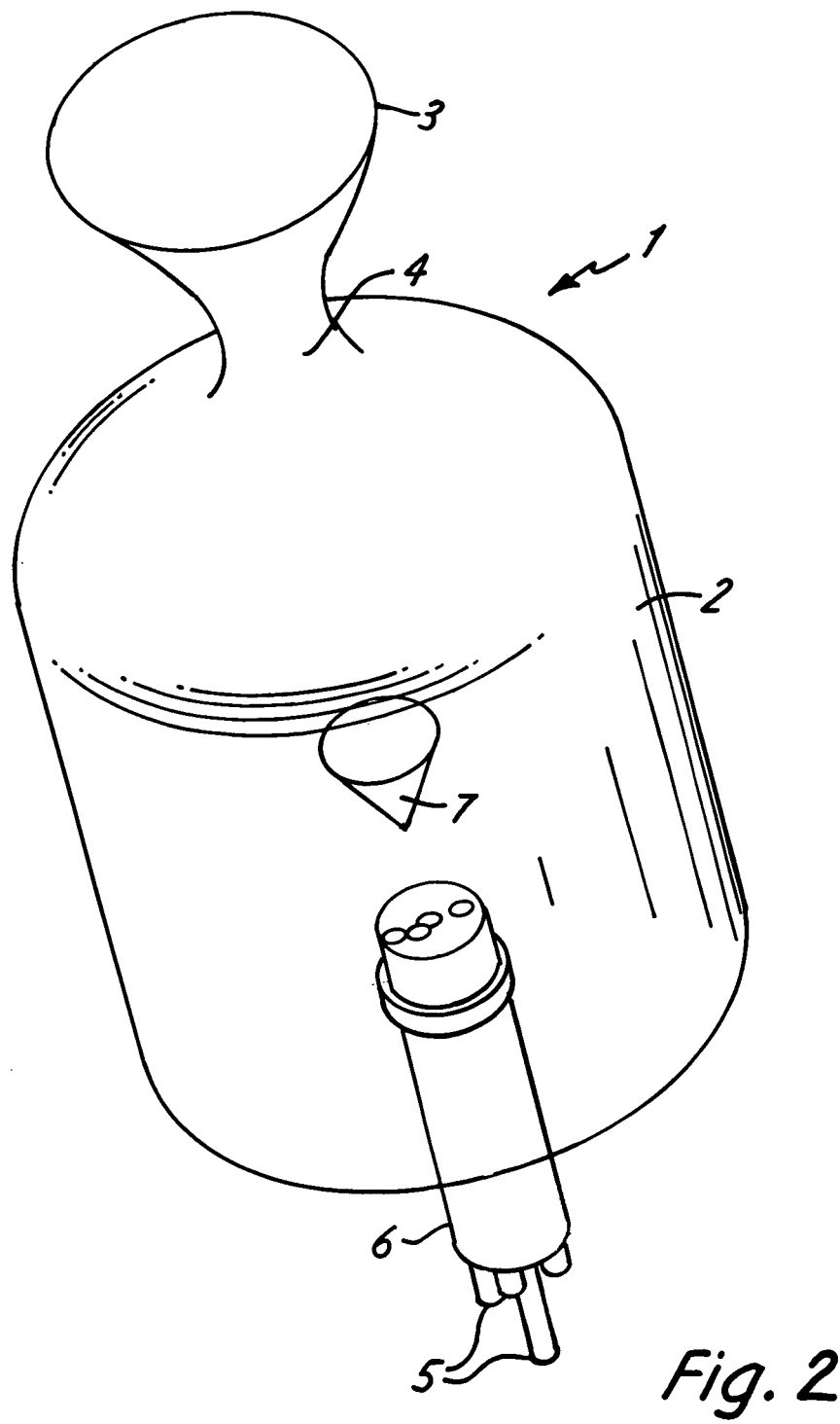
FIG. 2 is a transparent view from above of the reactor.
Figure 3:
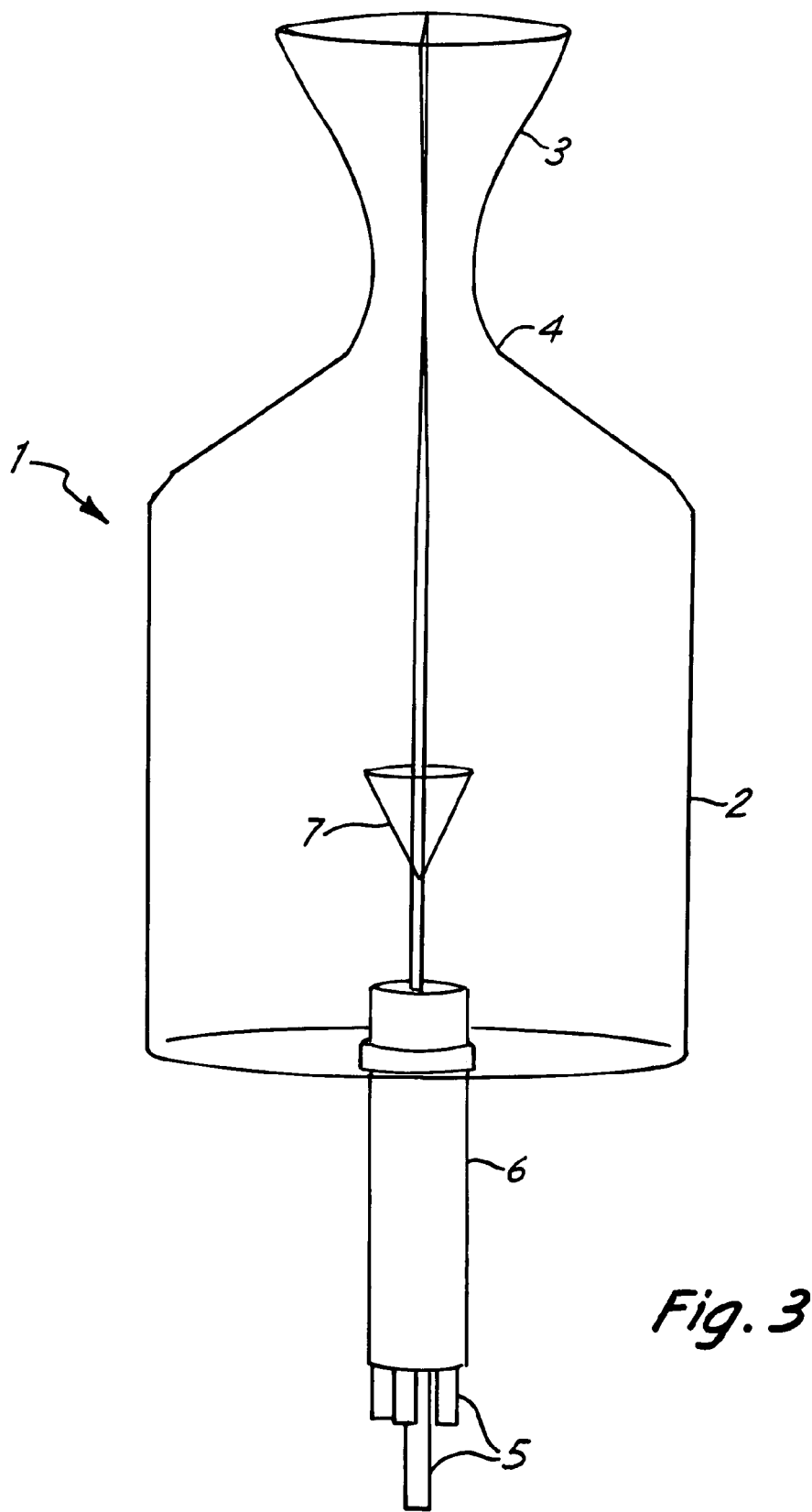
FIG. 3 is a transparent side view of the reactor.

The figures show the reactor 1 according to the invention with a reaction chamber 2, with the reactor head 3 adjacent to the outlet opening 4. Supply leads 5 and 6 are embedded in the center of the bottom of the reactor 1 in coaxial direction. As deflection surface a cone 7, the tip of which is oriented in the direction of the supply leads 5 and 6 is disposed along the axis in the interior of the reaction chamber 2 in this example.

The upper part of the reaction chamber 2 in this example tapers hyperboloid-like-like ally in the direction of the outlet opening 4 and continues from there hyperboloid-like-like ally in the reactor head 3. This geometry causes a nozzle effect, by which flowing gases are sucked out of the interior of the reaction chamber 2 by the vacuum in the area of the outlet opening and the reactor head, whereby the supply pressure in the supply leads 5 and 6 can be additionally reduced. At the same time this enables a self-cleaning of the reactor, because non-burnable particles and residues are sucked by the suction effect out of the interior of the reactor. Such residues can be deposited by filtering the combustion gases.

In this embodiment the reactor has a volume of about 15 liters and is fabricated of stainless steel. It is favorable to fabricate it of a more temperature-resistant and mechanically more solid material such as a Nimonic alloy, which has the following composition: C=0.057; Si=0.18; Mn=0.36; S=0.002; Al=0.47; Co=19.3; Cr=19.7; Cu=0.03; Fe=)0.55; Mo=5.74; Ti=2.1; Ti+Al=2.59 (in weight percent), ppm amounts of Ag, B, Bi and Pb, balance nickel. The elements contained therein at the same time cause a catalytic cracking of hydrocarbons. The reactor can be fabricated of this material with wall thicknesses of 3 to 4 mm, which measure 5 to 7 mm with stainless steel. An outer insulation of the reactor 1 of a material of ceramics fibres or fiberglass, which decreases the heat radiation and thus increases the temperature in the interior of the reactor is favorable.

By the supply leads 5, which are formed by Venturi tubes with a diameter of 3 to 7 mm liquid fuel, namely waste oil and heavy oils of different compositions and solid fuel, especially dried olive bagasse and sewage sludges, is sucked by pressurized air of respective (not shown) reservoirs and transported into the interior of the reaction chamber 2 with pressures of 3 to 5 bar. At the exit of the supply leads 5 the fuel flow disintegrates, and the fuel impinges onto the deflection surface 7 with high velocity, from which the fuel is symmetrically distributed into the cross-section of the reaction chamber. Water injected through a supply lead 5 is atomized and evaporates when exiting into the reaction chamber 2, and the water vapour is also symmetrically distributed in the reaction chamber 2. By the supply lead 6, in which the supply leads 5 are disposed, additionally pressurized air can be fed on demand, in order to provide the amount of air, which is required for the complete combustion.

About 30 to 40 l/h water and 70 to 80 l/h waste oil are introduced into the reaction chamber 2. Solid fuels like dried biomass are supplied at 10 to 130 l/h. If liquid and solid fuels are also to be introduced the supplied amounts have to be decreased correspondingly. The power of the burner is nearly 1 $MW_t$. The toxic emissions are low to negligible.

The control of the combustion process is performed by measuring the temperature, the amount and the chemical composition of the combustion gases. Accordingly the amounts of the supplied water, air and fuel are controlled.

The illustrated structure of the reactor results in a symmetric distribution of the physical quantities of the combustion process rotationally symmetric with respect to axis points of the reaction chamber 2. In a cross section of the reaction chamber 2 the values of the temperatures, pressure, and flow velocity of the gases are almost constant. The temperatures increase from the bottom of the reaction chamber 2 in the direction of the outlet opening 4, wherein a flattening of the temperature gradients is caused by the heat conductive reactor walls in continuous operation.

The fluid dynamic of the combustion process can be adjusted at a change of the reactor geometry and the position and geometry of the deflection surface.

The fuels are completely burnt in the reactor. Possibly not burnable residues are transported by the suction effect out of the interior of the reactor and can be collected with a filter. The nozzle effect of the reactor 1 can be adjusted together with the supply velocity, so that the combustion gases leave the reactor head 3 with the velocity of sound at a temperature of about 1200° C. to 1500° C.

Different industrial applications of the reactor and combustion method of the invention are favorable. For example, with the hot combustion gases a fluid bed can be operated, in which sand is penetrated by hot gas. Such fluid beds are usually used to clean objects (for example, of varnish residues). This use is also favorable for the disposal of special waste. Biomass can be subjected to a pyrolysis process on the fluid bed by intentional lack of air, whereby solid and gaseous fuels, which can be directly used for current generation in a combustion motor. Finally the combustion method of the invention can be used for the combined generation of heat and electric current, i.e. for the operation of vapour turbines and also of gas turbines.

The invention permits an environmentally friendly combustion of hard to dispose waste products like waste oils of different composition, sewage sludges, olive bagasse, mineral carbon and other burnable waste products.

Figure 4:
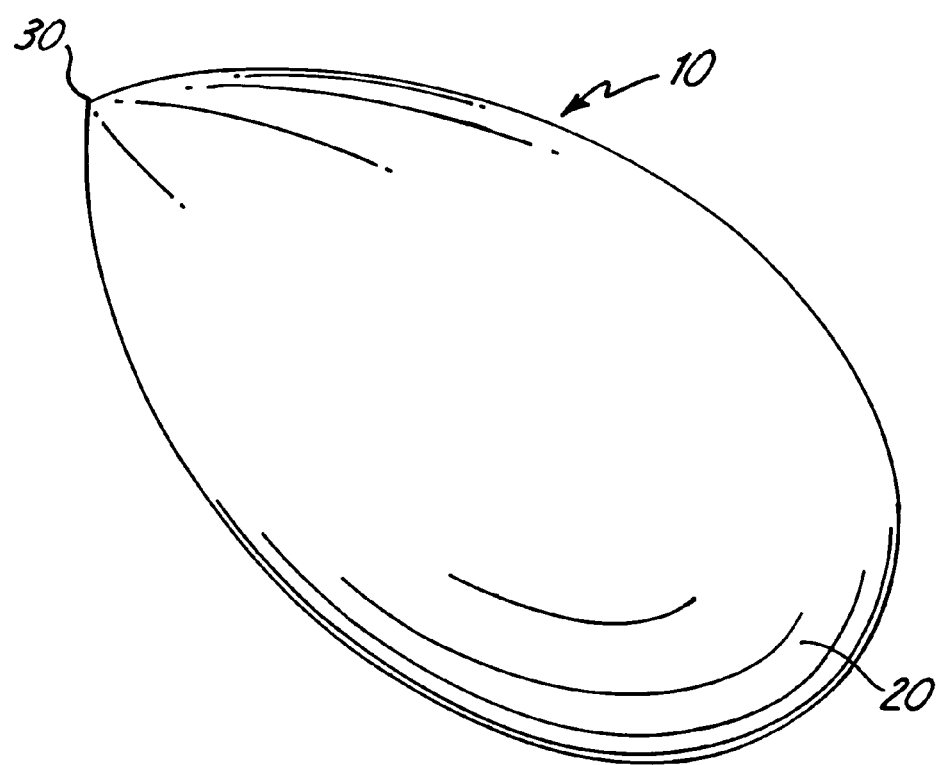
FIG. 4 shows the streamlined body according to the invention with a rotationally symmetrical shape.

FIG. 4 shows in three-dimensional view a streamlined body 10 according to the invention with two stagnation points 20 and 30. The streamlined body 10 is rotationally symmetrical in shape and in this example substantially corresponds to a rotationally symmetrical airfoil. From the fluidics point of view a favorable arrangement is one in which the stagnation point 20 is used as the front stagnation point and stagnation point 30 is used as the rear stagnation point, i.e. the flow runs from the front stagnation point 20 to the rear stagnation point 30.

Figure 5:
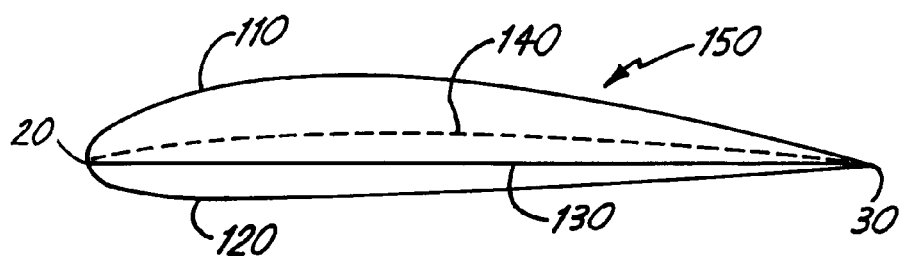
FIG. 5 shows the airfoil which is the basis for the geometry of the streamlined body according to the invention.

FIG. 5 shows an example of an airfoil 150 with a top side 110 and an underside 120, a front stagnation point 20 and a rear stagnation point 30 as well as a profile chord 130 and a central line 140. When an airfoil 150 of this kind is rotated about the profile chord 130 the surface of a streamlined body 10 according to the invention is produced, as shown in FIG. 4, for example. As can be seen from FIG. 5, when the airfoil is rotated, only the top 110 is relevant because of the geometry, so that the rotationally symmetrical streamlined body can also be produced by rotating the top side 110 of the airfoil (or a cross section of an aeroplane wing) about the profile chord 130.

Figure 6:
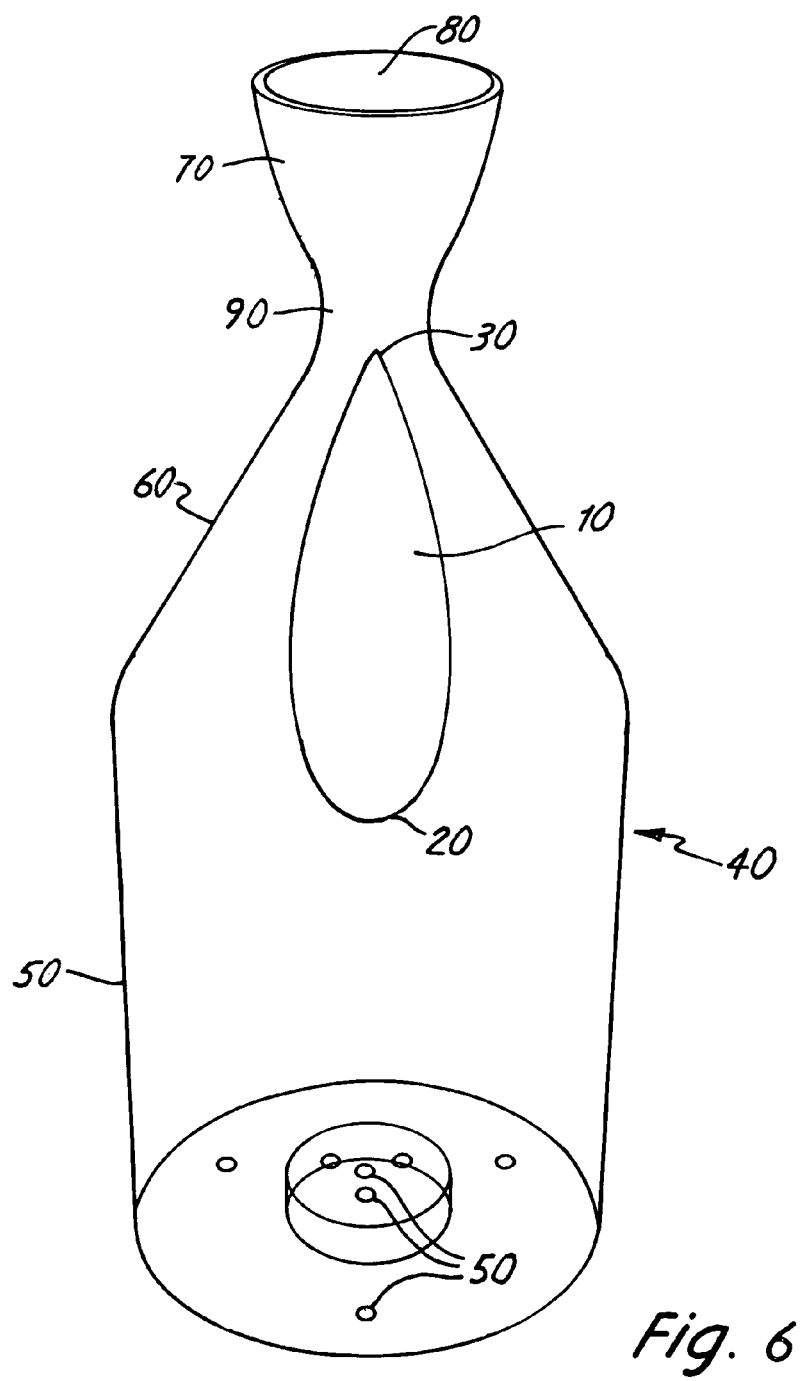
FIG. 6 shows a possible use of the streamlined body according to the invention in a combustion process in a mixing and reaction chamber.

FIG. 6 shows an embodiment of an apparatus according to the invention for burning fuels with a streamlined body 10 as described above. This Figure shows a mixing and reaction chamber 40 the lower section 50 of which is cylindrical in shape and which initially tapers conically upwards in section 60. The cross section of the chamber is at its smallest in the neck 90 and from that point onwards increases in size again in the head 70. The head 70 of the chamber is hyperboloid-like in form. The outlet opening of the chamber is designated 80. In the base of the chamber 40 are supply lines 50 for the constituents of the mixture which is to be burnt, such as for example gaseous and or liquid and/or solid fuel, air and/or an additional or different oxidant and possibly water or other additives.

The embodiment of the combustion device shown here is used particularly as a burner with a variety of industrial applications (heating furnaces, melting materials such as metals or glass, evaporating water or other liquids). Another possible use for the apparatus according to the invention is as a propulsion unit for generating thrust. For this, a similar embodiment to the one shown in FIG. 6 may be used, except that the base of the chamber 40 may be wholly or partly removed to allow flow through the interior of the apparatus. One possibility here is to use it as a propulsion unit in a fluid such as air or particularly water.

The ingredients of the fuel mixture are initially carried into the interior of the chamber 40 under pressure and ignited inside the chamber 40. For details of the combustion process reference is hereby expressly made to WO99/24756 by the same applicant which is herein incorporated by reference in its entirety.

Because of the flow conditions in the mixing and reaction chamber 40 the actual combustion flame is formed in the vicinity of the outlet opening 80. The flow conditions inside the chamber must be designed so that the flame is prevented from breaking off on the one hand and from blowing back into the interior of the chamber on the other hand. An ideal instrument for regulating and controlling the flow conditions inside the chamber 40 is the streamlined body 10 according to the invention. It can be fixedly or moveably secured by retaining and/or guide strips inside the chamber 40, while it is particularly advantageous for it to be moveable along the main axis of the chamber in the direction of the neck 90.

Figure 7:
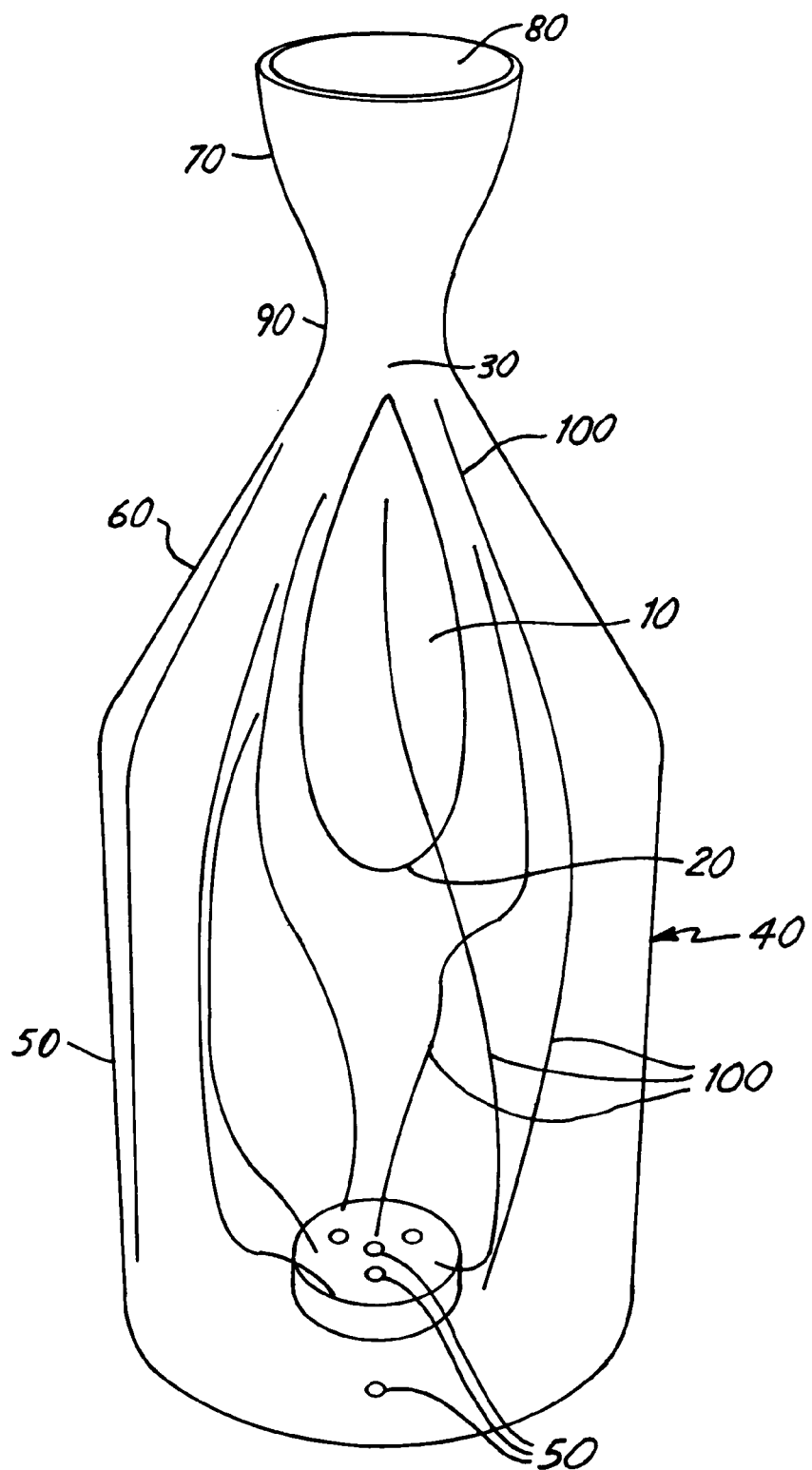
FIG. 7 shows the trajectories of a fluid current in the mixing and reaction chamber shown in FIG. 6 during the combustion process.

FIG. 7 shows the stream of particles formed during the operation of the mixing and reaction chamber 40. The trajectories 100 clearly show that in the lower cylindrical section 50 of the chamber 40 turbulence occurs, in which individual trajectories describe a path back towards the bottom of the chamber 40. This turbulence is beneficial to the combustion process as it results in more intensive mixing and a longer residence time of the components of the fuel mixture in the chamber 40, thereby assisting complete combustion.

Further along, i.e. towards the tapering section 60 of the chamber, FIG. 7 clearly shows a more ordered flow which becomes laminar along the streamlined body 10 according to the invention, while the profile of the streamlined body 10 according to the invention continues, so to speak, in the direction of flow.

At the rear stagnation point 30 of the streamlined body 10, which is disposed virtually in the neck 90 of the chamber 40 in the embodiment shown in FIG. 7, there is a completely uniform flow leaving the chamber 40 via the head 70 of the chamber through the outlet opening 80. A flame (not shown) burns steadily at this point.

It should be pointed out that FIG. 7 shows the flow pattern of a fluid and/or particles carried along by a fluid by means of trajectories of model particles illustrated by way of example.

Figure 8:
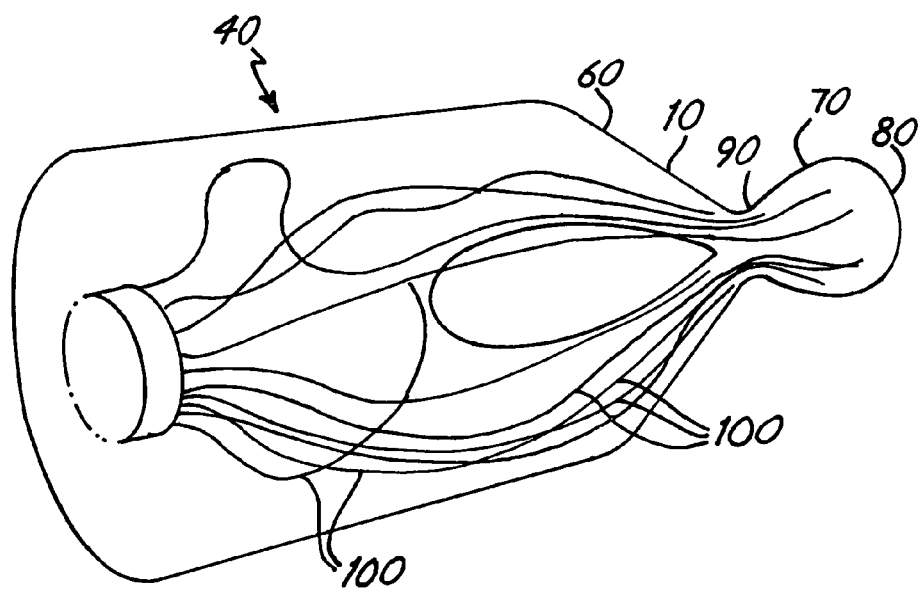
FIG. 8 shows a view similar to FIG. 7.

A similar view to that of FIG. 7 is provided in FIG. 8, for which a different three-dimensional view is used. The remarks made in connection with FIG. 7 discussed above also apply here. Similar parts have been given the same reference numerals.

Figure 9:
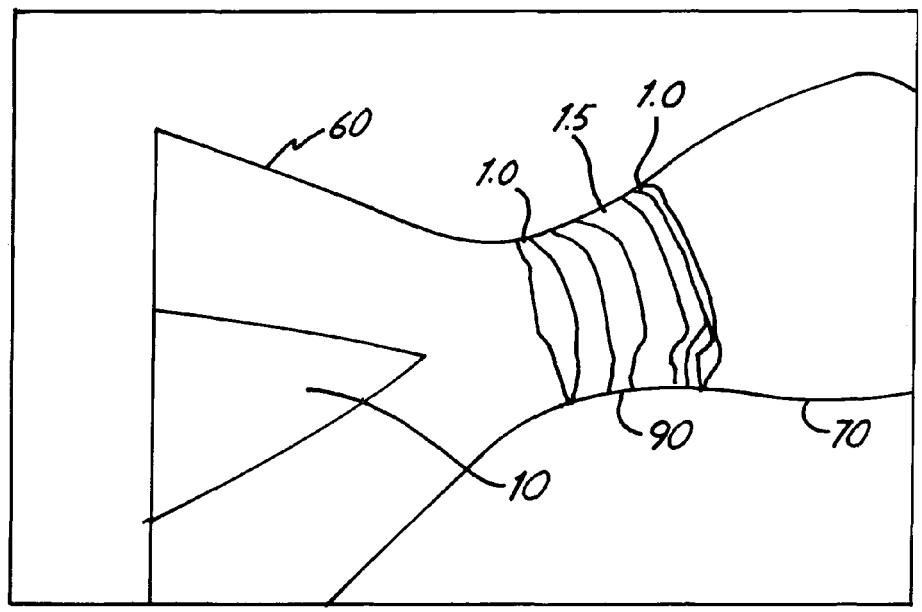
FIG. 9 shows the Mach numbers in the neck of the mixing and reaction chamber from FIGS. 7 and 8.

FIG. 9 shows the upper section of a mixing and reaction chamber 40 as shown in FIGS. 7 and 8, showing the conditions of speed distribution in the neck 90 of the chamber 40. The distribution of the Mach numbers in the neck 90 and in the head 70 of the chamber 40 are shown during a combustion process. The temperatures in this example are about 1300° C. The Mach numbers, i.e. multiples of the speed of sound, are shown in different shades of grey. The grey shading means that the original colour information is lost and has to be replaced by a description in words: the Figure clearly shows the darker sleeve around the neck 90 of the chamber 40, indicating areas in which the mixture flowing out has exceeded the speed of sound. The bar on the left of the Figure indicates the values occurring which are between 1.0 and 1.5 times the speed of sound. Values below the speed of sound are shown by the even grey colour in FIG. 9. The streamlined body 10 positioned close to the neck 90 is clearly shown. The distribution of the Mach numbers is now as follows: beginning with Mach 1.0 at the bottom dark edge of the sleeve, the Mach number rises continuously to 1.5, and the grey coloration thus corresponds precisely to the bar shown on the left-hand edge of the Figure. The value 1.5 is again indicated by a dark section. Then the Mach number decreases again to 1.0, this reduction occurring within a shorter section of the sleeve, so that here again we have the reverse distribution of the bar shown in the left-hand edge of the Figure.

Supersonic speed is reached, as described, by the interaction of the streamlined body 10 according to the invention with the geometry of the chamber 40. The head 70 and neck 90 of the chamber are hyperboloid-like in shape and adjoin the tapering section 60 so that this very geometry causes a sharp acceleration of flow towards the outlet opening 80. This is further increased by the streamlined body 10 according to the invention, on the surface of which there is a reduction in pressure leading to an increase in flow velocity.

Figure 10:
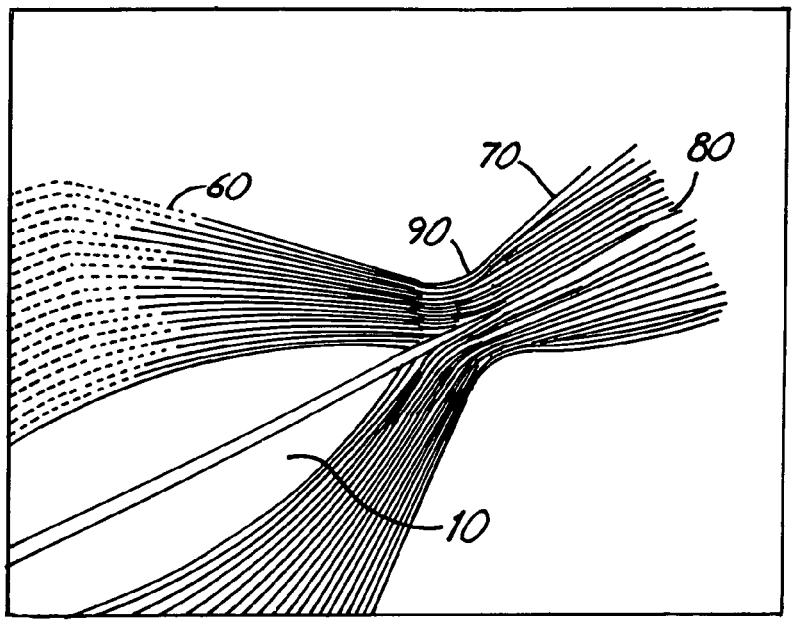
FIG. 10 shows the velocity vectors in the upper part of a mixing and reaction chamber as shown in FIGS. 7 and 8.
Figure 11:
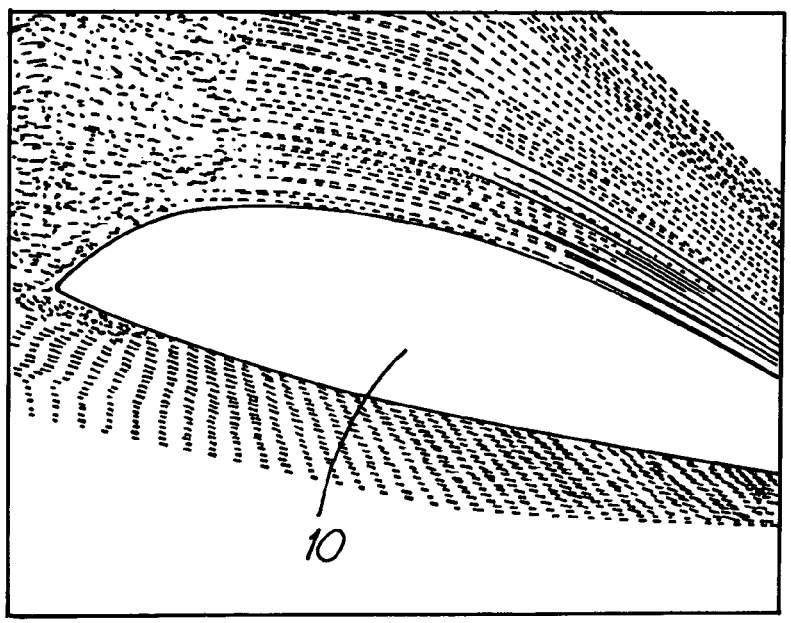
FIG. 11 shows a view according to FIG. 10 with a higher resolution.

Finally, FIGS. 10 and 11 show the distribution of the speed vectors in the upper part of the mixing and reaction chamber and on the streamlined body 10 during a combustion process, while FIG. 11 shows a detail on a larger scale in which the streamlined body is not shown in its fully rotationally symmetrical form but is cut away at an angle of 120°.

It is clear how the profile of the streamlined body 10 continues in the flow, extending fully uniformly between the streamlined body 10 and the wall of the chamber 40 towards the neck 90.

Suitable materials for the streamlined body 10 according to the invention might be, for example, an (ODS) Ni alloy or ceramic alloy or a ceramic coating, particularly for use in a combustion process.

Although the present invention has been described with reference to preferred embodiments, persons skilled in the art will recognize that changes may be made in form and detail without departing from the spirit and scope of the invention.

We claim:

1. A streamlined body for influencing flow dynamics of at least one of a flowing fluid or of particles carried by a flowing fluid, comprising:
    a body shaped as a solid of revolution of an upper profile of an airplane wing profile,
    the upper profile being defined by a continuously convex curve from a front stagnation point of the airplane wing to a rear stagnation point of the airplane wing, and a profile chord extending from the front stagnation point to the rear stagnation point;
    the solid of revolution formed by rotating the upper profile about a central axis coinciding with the profile chord such that the solid of revolution forms a substantially blunt first end at the front stagnation point and a pointed second end at the rear stagnation point.

2. The streamlined body of claim 1, wherein the streamlined body is configured such that when placed with the profile chord in a direction of fluid flow, a suction effect is produced in the direction of fluid flow.

3. The streamlined body of claim 1, wherein the streamlined body is heat-conducting and acts as a heat exchanger in a fluid flow with a temperature gradient.

4. The streamlined body of claim 1, additionally comprising: a reaction chamber for enveloping the streamlined body and including a longitudinal axis extending therethrough, the streamlined body being arranged with the profile chord substantially parallel to the longitudinal axis of the reaction chamber.

5. The streamlined body of claim 4, wherein the second end of the streamlined body is arranged downstream with respect to a direction of fluid flow in the reaction chamber.

6. The streamlined body of claim 5, wherein the streamlined body is configured to separate, distribute, or atomise gaseous, liquid or solid constituents present in a fuel mixture of the fluid flow.

7. The streamlined body of claim 6, wherein the substantially blunt first end is configured for slowing down the constituents of the fuel mixture to increase a residence time of these constituents and to mix these constituents more thoroughly.

8. The streamlined body of claim 6, wherein the streamlined body is configured for accelerating the flow of the fuel mixture and combustion products in the reaction chamber downstream.

9. The streamlined body of claim 4, wherein the reaction chamber includes at least one inlet port and the streamlined body is spaced apart from the at least one inlet port at a predetermined distance.

10. The streamlined body of claim 1, wherein the substantially blunt first end acts as an impact surface for the fluid flow.

11. The streamlined body of claim 1, wherein the body is configured to entrain the flowing fluid or the particles into a laminar flow.

12. A streamlined body for influencing the flow dynamics of at least one of a flowing fluid or of particles carried by a flowing fluid, comprising:
    a body shaped as a solid of revolution of a top side of an airplane wing profile about a profile chord of the profile;
    the top side being defined by a continuously convex curve from a front stagnation point to a rear stagnation point of the airplane wing profile and the profile chord extending from the front stagnation point to the rear stagnation point;
    the body being defined by revolution of the top side, along the profile chord, about a central axis of the body; such that the solid of revolution forms a substantially blunt first end corresponding to the front stagnation point and a pointed second end corresponding to the rear stagnation point.

13. The streamlined body of claim 12, wherein the rotational axis is oriented in a direction of flow in an otherwise free cross section of flow to produce a suction effect in the direction of flow.

14. The streamlined body of claim 12, wherein the streamlined body includes a heat-conducting material that causes the streamlined body to act as a heat exchanger in a fluid flow with a temperature gradient.

15. The streamlined body of claim 12, wherein the streamlined body is configured to act as a flow regulator.

16. The streamlined body of claim 12, wherein the substantially blunt first end acts as an impact surface for the fluid flow.

17. The streamlined body of claim 12, wherein the body is configured to entrain the flowing fluid or the particles into a laminar flow.

18. A method for influencing flow dynamics of at least one of a flowing fluid or of particles carried by a flowing fluid, comprising:
    providing a streamlined body shaped as a solid of revolution of an upper profile of an airplane wing profile, the upper profile being defined by a continuously convex curve from a front stagnation point of the airplane wing to a rear stagnation point of the airplane wing, and a profile chord extending from the front stagnation point to the rear stagnation point, the solid of revolution formed by rotating the upper profile about a central axis coinciding with the profile chord such that the solid of revolution forms a substantially blunt first end at the front stagnation point and a pointed second end at the rear stagnation point; and
    placing the streamlined body within the flowing fluid.

19. The method of claim 18, wherein the step of placing the streamlined body within the flowing fluid comprises utilizing the substantially blunt first end as an impact surface for the particles.

20. The method of claim 18, wherein the step of placing the streamlined body within the flowing fluid comprises utilizing the streamlined body to produce laminar flow of the flowing fluid.

21. A reactor comprising:
    a vessel including a cylindrical main portion in communication with an outwardly tapered head portion terminating in an outlet opening, an inner chamber for accommodating fluid flowing therethrough, at least one inlet port extending at least into the inner chamber defined by the cylindrical main portion, and a longitudinal axis extending through the vessel; and,
    a streamlined body within the inner chamber for influencing the flow dynamics of at least one of a flowing fluid or of particles carried in a flowing fluid, the streamlined body shaped as a solid of revolution of an upper profile of an airplane wing profile, the upper profile being defined by a continuously convex curve from a front stagnation point of the airplane wing to a rear stagnation point of the airplane wing, and a profile chord extending from the front stagnation point to the rear stagnation point
    the solid of revolution having an outer surface formed by rotating the upper profile about a central axis coinciding with the profile chord such that the solid of revolution forms a substantially blunt first end at the front stagnation point and a pointed second end at the rear stagnation point, the streamlined body producing laminar flow of at least one of the flowing fluid or of the particles carried by the flowing fluid along the outer surface.

22. The reactor of claim 21, wherein the streamlined body is spaced apart from the at least one inlet port at a predetermined distance, for fuel from the at least one inlet port to impact the outer surface.

23. The reactor of claim 22, wherein the profile chord defines an axis of symmetry for the streamlined body and the longitudinal axis defines an axis of symmetry for the interior chamber of the vessel.

24. The reactor of claim 21, wherein the cross-sectional shape of the airplane wing is configured to entrain fluids and any particles carried by the fluids into the laminar flow.

25. A reactor comprising:
a vessel for supporting ignition of fuel and fluid flow therethrough, the vessel including at least one inlet port and at least one outlet opening; and
a streamlined body within the vessel positioned intermediate the inlet port and the outlet opening, the streamlined body shaped as a solid of revolution of an upper profile of an airplane wing profile, the upper profile being defined by a continuously convex curve from a front stagnation point of the airplane wing to a rear stagnation point of the airplane wing, and a profile chord extending from the front stagnation point to the rear stagnation point,
the solid of revolution having an outer surface formed by rotating the upper profile about a central axis coinciding with the profile chord such that the solid of revolution forms a substantially blunt first end at the front stagnation point and a pointed second end at the rear stagnation point, the streamlined body including a rotationally symmetric surface for causing laminar flow of the flowing fluid and any particles in the flowing fluid along the streamlined body.

26. The reactor of claim 25, wherein the streamlined body is spaced apart from the at least one inlet port at a predetermined distance, and the rotationally symmetric surface acts as an impact surface for distributing fuel from the at least one inlet port.

27. The reactor of claim 25, including a longitudinal axis extending through the vessel and the profile chord is coincident with the longitudinal axis.

28. The reactor of claim 25, wherein the streamlined body is configured to entrain fluids and any particles carried by the fluids into the laminar flow.

* * * * *